Jan. 15, 1929.

F. H. SHERRERD 1,698,738

PIPE JOINT STRUCTURE

Filed June 18, 1926

INVENTOR.
Francis H. Sherrerd,
BY
Fraentzel and Richards
ATTORNEYS.

Patented Jan. 15, 1929.

1,698,738

UNITED STATES PATENT OFFICE.

FRANCIS H. SHERRERD, OF EAST ORANGE, NEW JERSEY, ASSIGNOR TO NEWARK CONCRETE PIPE CO., OF NEWARK, NEW JERSEY, A CORPORATION OF NEW JERSEY.

PIPE-JOINT STRUCTURE.

Application filed June 18, 1926. Serial No. 116,915.

This invention relates, generally, to improvements in the joint structure of concrete pipe or conduit adapted for high pressure service.

It is the object of this invention to provide in connection with reenforced concrete pipe of the bell and spigot type, and especially in connection with reenforced concrete pipe having imbedded therein metallic tubular cores rendering the same particularly suitable for high pressure service, with a novel construction and arrangement of joint, including, in association with the bell or spigot end of each pipe or conduit section, an inclined annular seat for the support of a suitable packing element or gasket, said seat having a fixed annular abutment or shoulder at its outer end to engage the packing element or gasket when the latter is tamped into place, so as to efficiently hold the same against displacement or disturbance by the relative movements of adjoining pipe or conduit sections, due to expansion and contraction, and between the respective bell and spigot portions of which said packing element or gasket is disposed.

Such joint structure is not only relatively inexpensive per se, but pipe or conduit provided therewith may be installed in less time and by less expensive labor, since it involves no movable or adjustable parts or mechanical devices requiring special manipulation and more or less skilled labor to assemble in connection with the pipe sections.

My present invention is illustrated in the accompanying drawings, in which:—

Figure 1 is in part a side elevation and in part a vertical longitudinal section showing adjoined ends of pipe or conduit sections equipped with the novel joint structure made according to and embodying the principles of my present invention.

Figure 2 is a fragmentary cross sectional view, taken on line 2—2 in said Figure 1.

Figure 3 is a fragmentary longitudinal section of the bell end of a pipe or conduit section showing the annular inclined seat and fixed abutment or shoulder for the support of a packing element or gasket, the latter being omitted.

Similar characters of reference are employed in all of the herein above described views, to indicate corresponding parts.

In the drawings, the reference character 4 indicates adjoining pipe or conduit sections made of concrete, and reenforced in the usual manner by longitudinally spaced metallic rings 5 interconnected with longitudinal reenforcing bars 6, and additionally reenforced, if desired, by wire mesh 7, or any other suitable reenforcing structure. When concrete pipe of this character is to be employed for high pressure service it is customary to imbed within the concrete body tubular or cylindrical metallic cores, indicated in the drawings by the reference character 8.

In the embodiment of my invention shown in the accompanying drawings, the annular inclined seat for the packing element or gasket is shown in connection with the bell end of the pipe or conduit section in combination with a straight or axially parallel cylindrical surface of the spigot end of the adjoining pipe or conduit section, although it will be understood this arrangement may be reversed and said inclined seat may be provided in connection with the spigot end of the pipe or conduit section in combination with a straight or axially parallel cylindrical surface of the bell end of an adjoining pipe of conduit section.

Said cylindrical metallic core 8 in each pipe or conduit section 4 is so positioned, when imbedded in the body thereof, that one end projects at the bell end 4' so as to be exposed on a portion of the inner surface thereof as at 9. The internal surface of the bell end 4' of said pipe or conduit section, beyond the exposed end 9 of said cylindrical metallic core 8, is outwardly and annularly flared or inclined, as at 10. Arranged against the said annularly flared or inclined portion 10 of the bell is a metallic lining or facing 11, the exposed surface of which provides the annular inclined seat 12 for a packing element or gasket. The inner end of said metallic lining or facing 11 abuts the end 9 of said cylindrical core 8, and is preferably welded thereto. If desired an annular butt strap 13 may be associated with the adjoined ends of said core 8 and facing 11, and also welded thereto to firmly anchor the latter against displacement from the bell 4'. Suitably secured to the outer end portion of said facing 11 is an internally projecting annular shoulder or abutment 14, which serves as a stop bounding the outer end of the inclined seat 12 with which the bell is provided.

The cylindrical metallic core 8 in each pipe or conduit section 4 terminates at the base of the spigot end 4″ of the pipe or conduit, and welded to the metallic core 8 is a cylindrical metallic spigot lining 15 which is inwardly offset so as to telescope slidingly into the end 9 of the core 8 of an adjoining pipe or conduit section when the bell and spigot portions of adjoining pipe or conduit sections are interengaged together. The exposed face of said spigot lining 15 provides a smooth cylindrical surface 16 parallel to the axis of the conduit, and opposed to the inclined annular seat 12 of the bell 4′.

The length of the spigot 4″ exceeds somewhat the depth of the bell 4′, so that when said parts are interengaged together, an annular open channel or space will be provided intermediate the shoulder 17 of the spigot 4″ and the end 18 of the bell.

When the bell and spigot ends of adjoining pipe or conduit sections are interengaged together, a packing element or gasket is placed intermediate the cylindrical surface 16 of the spigot and the annular inclined seat 12 of the bell. This packing element or gasket comprises a hollow annular member 19 of relatively soft or malleable metal, such as lead, the interior of which is provided with a core 20 of any suitable fibrous material. The packing element or gasket thus formed is tamped or pounded into the space intermediate the annular inclined seat 12 and cylindrical surface 16, and being malleable, the same tends to readily conform to the cross sectional shape of said space under the effects of the applied tamping force. When the packing element or gasket is thus tamped home its lower edge will be caused to abut against the shoulder or abutment 14 of the seat 12, in stopped relation against the same, so that outward displacement thereof from the inclined seat 12 is prevented, and the same is thus held firmly in place, and particularly held against displacement under the influences of relative movement of the adjoined bell and spigot portions due to expansion or contraction of the pipe or conduit sections. The packing element or gasket not only provides a leak-proof packing adapted to withstand high pressures, but, in the event of expansion or contraction of the pipe or conduit sections, will permit of slip or movement of the cylindrical surface 16 of the spigot relative thereto without tendency to disturb the leak-proof packing function thereof.

It will be apparent that, the construction of the inclined seat 12 with its fixed inwardly projecting annular stop shoulder or abutment 14 bounding its outer limit is exceedingly simple, and yet very effective in holding the packing element or gasket in operative position, once the latter has been tamped into place, so as to be engaged with said stop shoulder or abutment. Such construction is not only simple and inexpensive, but, since it involves no movable parts or mechanism requiring mechanical manipulation or adjustment, requires no especially skilled labor in connection with the operations of laying or installing the pipe or conduit on the job.

After the packing element has been tamped into place, and the pipe or conduit tested for leakage and found tight, the annular space or channel between the shoulder 17 of the spigot and the end 18 of the bell is filled with cement or mortar 21, thus completing the joint structure intermediate adjoining pipe or conduit sections.

Having thus described my invention, I claim:—

1. A joint structure for concrete pipe sections having slidingly interengageable male and female end portions, one of said end portions having an inclined annular seat angularly diverging from the smooth cylindrical surface of the other end portion, said seat having a fixed inwardly projecting annular stop shoulder bounding its outer limit, and a packing element interposed between said seat and the opposing cylindrical surface of said other end portion and adapted to be tamped into position with an outer margin of the same engaged in stopped abutment behind said annular stop shoulder, said stop shoulder being spaced at a distance from the said opposing cylindrical surface to provide a space for the insertion and tamping in place of said packing element, and the angular juncture of said seat with said opposing cylindrical surface operating to retain the packing element at its inner end subject to tamped pressure.

2. A joint structure for concrete pipe sections having slidingly interengageable male and female end portions, one of said end portions having an inclined annular seat angularly diverging from the smooth cylindrical surface of the other end portion, one of said end portions having a fixed annular stop shoulder near its outer limit and projecting into the space between the two said end portions, and a packing element interposed between said seat and the opposing end member and adapted to be tamped into position with an outer margin of the same engaged in stopped abutment behind said annular stop shoulder, and said inclined annular seat and said opposed cylindrical surface mutually meeting to provide a positive stop for said packing element, and said stop shoulder being spaced at a distance from the said opposed cylindrical surface to provide a space for the insertion and tamping into place of said packing element.

In testimony, that I claim the invention set forth above I have hereunto set my hand this 17th day of June, 1926.

FRANCIS H. SHERRERD.